(12) United States Patent
Zeller

(10) Patent No.: US 8,931,984 B2
(45) Date of Patent: Jan. 13, 2015

(54) PROCESSING HEAD

(75) Inventor: Thomas Zeller, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 1142 days.

(21) Appl. No.: 12/935,401

(22) PCT Filed: Dec. 16, 2008

(86) PCT No.: PCT/EP2008/010718
§ 371 (c)(1),
(2), (4) Date: Sep. 29, 2010

(87) PCT Pub. No.: WO2009/121387
PCT Pub. Date: Oct. 8, 2009

(65) Prior Publication Data
US 2011/0027031 A1 Feb. 3, 2011

(30) Foreign Application Priority Data
Mar. 31, 2008 (DE) .......................... 10 2008 016 497

(51) Int. Cl.
*B23F 5/24* (2006.01)
*B23Q 5/28* (2006.01)
*B23F 1/00* (2006.01)
*B23F 9/00* (2006.01)
*B23F 23/12* (2006.01)

(52) U.S. Cl.
CPC ... *B23Q 5/28* (2013.01); *B23F 1/00* (2013.01); *B23F 9/00* (2013.01); *B23F 23/1237* (2013.01)

USPC .................... 409/11; 451/47; 409/18; 409/25; 409/38; 409/56

(58) Field of Classification Search
CPC ................ B23F 5/22; B23F 5/24; B23F 5/26; B23F 5/20; B23F 5/04; B23F 5/10
USPC ............. 409/238–239, 236, 5, 11, 17–18, 25, 409/38, 50, 56–57; 173/213–222, 164–167, 173/105; 451/360, 363, 47
See application file for complete search history.

(56) References Cited

U.S. PATENT DOCUMENTS

| | | | | |
|---|---|---|---|---|
| 3,221,605 | A | * 12/1965 | Hemmerle, Jr. | ............... 409/239 |
| 4,009,636 | A | * 3/1977 | Ainoura | ........................... 409/11 |
| 4,030,402 | A | * 6/1977 | Onsrud | ......................... 409/229 |
| 4,111,098 | A | * 9/1978 | Ainoura | ........................... 409/22 |
| 4,961,289 | A | 10/1990 | Sulzer | |
| 5,067,534 | A | * 11/1991 | Toivio | ........................ 144/215.2 |
| 5,584,621 | A | 12/1996 | Bertsche et al. | |
| 5,813,806 | A | * 9/1998 | Muller | ............................ 409/11 |
| 2005/0081351 | A1 | 4/2005 | Robotta et al. | |

FOREIGN PATENT DOCUMENTS

| | | |
|---|---|---|
| DE | 4431374 A1 | 3/1996 |
| DE | 19850603 | 5/2000 |

(Continued)

*Primary Examiner* — Daniel Howell
(74) *Attorney, Agent, or Firm* — Dilworth & Barrese, LLP.

(57) ABSTRACT

The present invention relates to a processing head for processing machines, preferably tooth milling and tooth grinding machines, comprising a direct drive which is arranged in a processing head bed of a processing machine, wherein the direct drive comprises at least two motors actuatable in synchronism with each other.

21 Claims, 7 Drawing Sheets

(56) References Cited

FOREIGN PATENT DOCUMENTS

| | | | | |
|---|---|---|---|---|
| GB | 2203079 A | * | 10/1988 | |
| JP | 59146715 A | * | 8/1984 | |
| JP | 10151523 A | * | 6/1998 | |
| JP | 2006-205393 | | 8/2006 | |
| JP | 2008-037044 | | 2/2008 | |

* cited by examiner

PRIOR ART

PROCESSING HEAD

BACKGROUND OF THE INVENTION

This invention relates to a processing head for processing machines, preferably tooth milling and tooth grinding machines, according to the generic part of claim 1.

In conventional processing machines, such as multifunctional machine tools, for example tooth milling and tooth grinding machines, the multiaxial movement and rotation of the milling spindle and the spindle head is controlled by remotely arranged motors, which employ synchronous belts, worm drives and wheels, bevel gears and spur gears or bevel gears which are functionally coupled with the spindle and the spindle head for rotating the spindle and the spindle head about two axes, individually or in combination (cf. for example U.S. Pat. No. 5,257,883).

From EP 0 885 081 B2 it is already known to directly drive a two-axis rotary head for a machine tool spindle without providing a transmission.

Such processing machine for processing toothings according to the prior art is shown in FIG. 1 by way of example.

In FIG. 1, a tooth milling machine 10 is represented schematically, in which a milling tool 12 is mounted as processing head on a spindle 14 in a processing head bed 16. The milling tool 12 is driven by an electric motor 18 via a gear train which is arranged on a side of the external milling head in the processing head bed 16. The other side of the spindle 14 is supported by a counter bearing 20, which likewise is arranged in the processing head bed. The milling tool 12 is used for processing an external toothing of a workpiece 22, which is only schematically shown in FIG. 1. The spindle 14 carrying the milling tool 12 is driven in direction of arrow a. It can be swiveled in direction of arrow b, so as to possibly fabricate helical toothings.

SUMMARY OF THE INVENTION

The object of the present invention consists in providing a processing head for processing machines, which is in particular suitable for use on large machines and is of comparatively small size despite possibly high torque requirements.

In accordance with the invention, this object is solved by the combination of the features herein. Accordingly, a processing head for processing machines, preferably tooth milling and tooth grinding machines is proposed, in which the direct drive comprises two or more motors actuatable in synchronism with each other. Due to this solution, a double or multiple torque is available, so that the construction volume of the drive is decreased. Thus, a smaller diameter of the motors can be realized with doubled or multiplied torque.

Preferred aspects of the invention can be taken from the description herein.

Accordingly, the motors can be actuatable in a master-slave operation. Alternatively, a synchronous actuation is also possible.

In accordance with a particularly advantageous aspect of the invention, the motors are arranged to be shifted and clamped in the carriage of the processing head, i.e. in the processing head bed. As a result, the tool mandrel length can be adapted to the diameter of the workpiece to be processed.

The processing head of the invention can not only be set against the workpiece from outside, but is also suitable for forming an internal milling head.

As internal milling head/grinding head it can be pivotally arranged in a holder together with the processing head bed and the motors which are designed correspondingly small, so that helical toothings also can easily be realized here for internal toothings.

BRIEF DESCRIPTION OF THE DRAWINGS

Further features, details and advantages of the invention can be taken from an embodiment illustrated in the drawing, in which.

DESCRIPTION OF THE PREFERRED EMBODIMENTS

Figure 1:
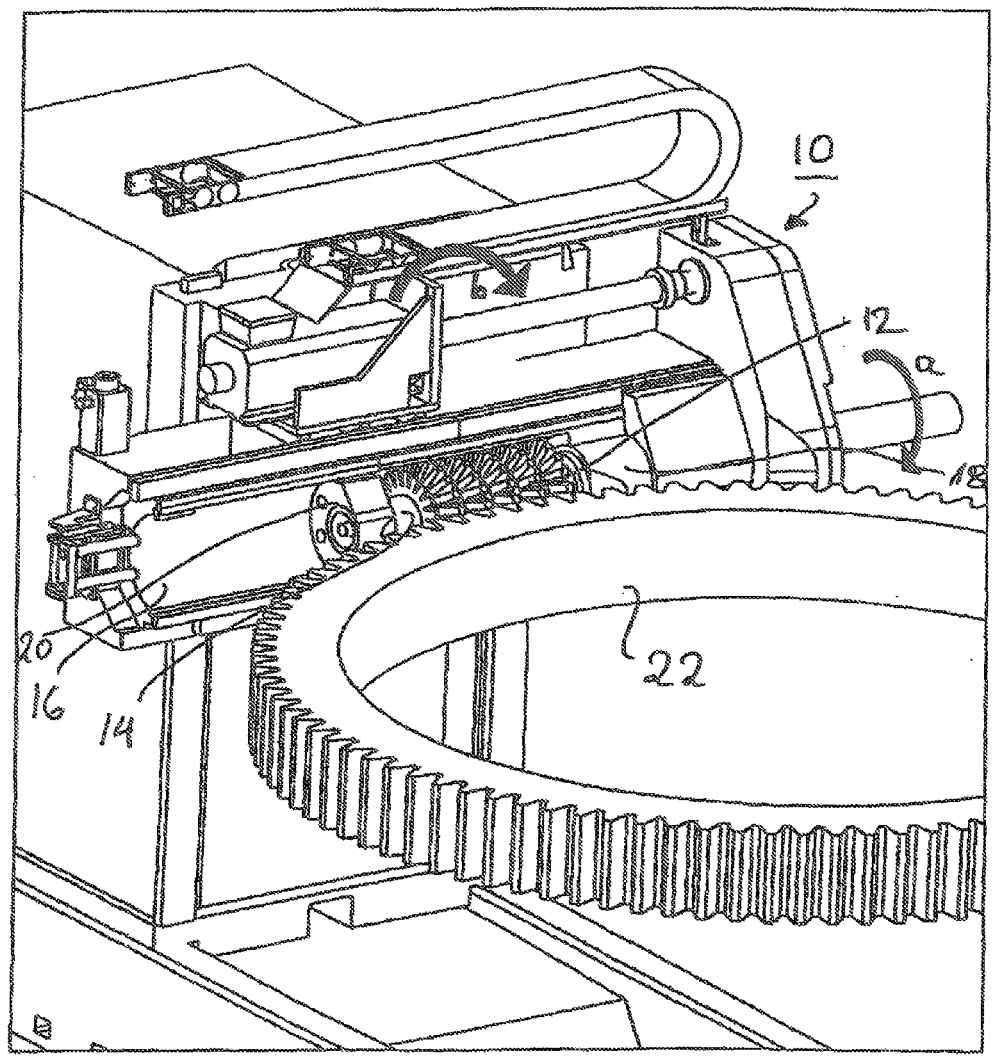
FIG. 1: shows a processing machine with a processing head in accordance with the prior art.
Figure 2:
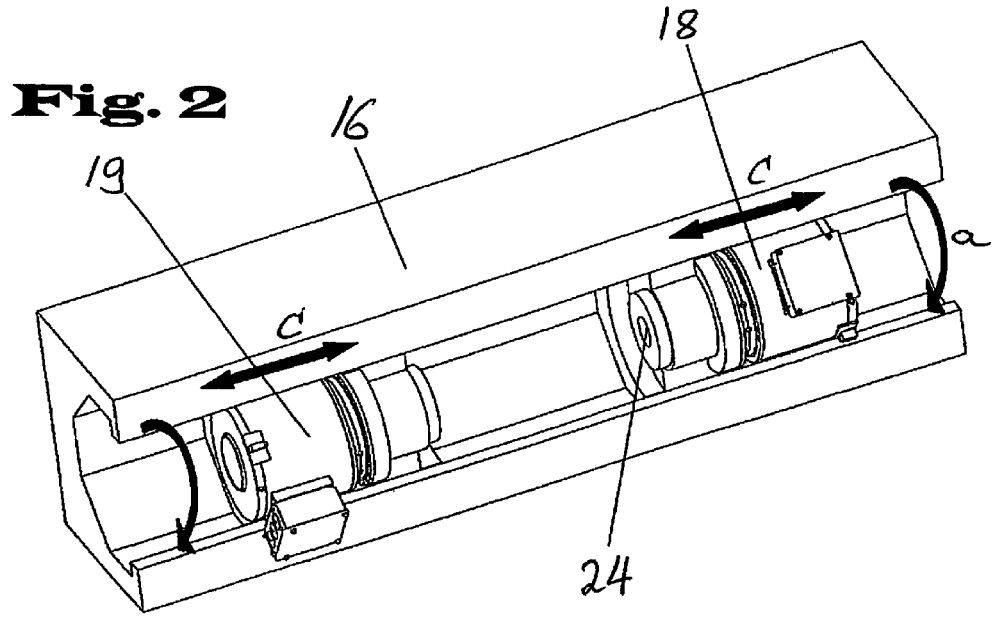
FIGS. 2 to 4: show processing heads in accordance with the invention in different configurations.
Figure 3:
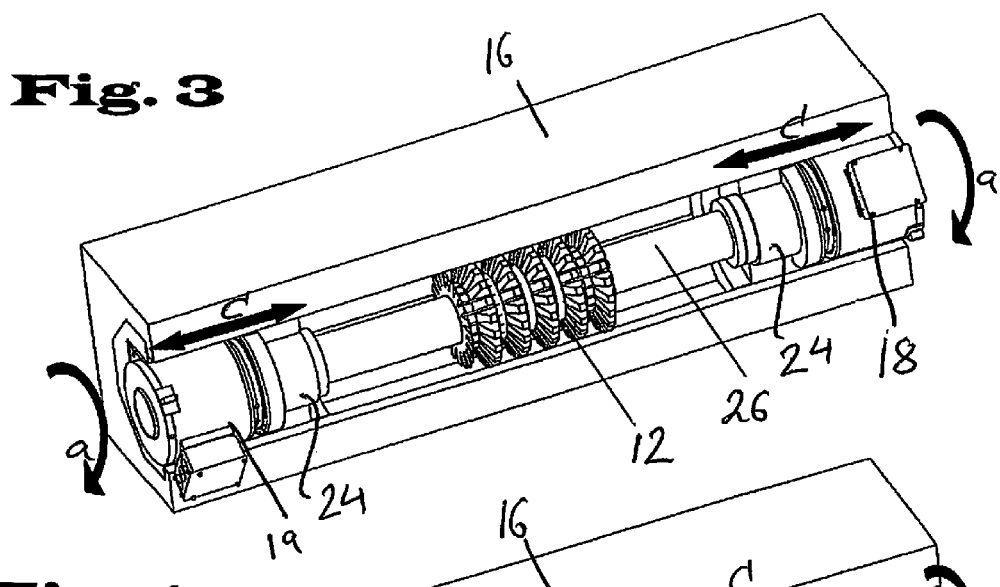
Figure 4:
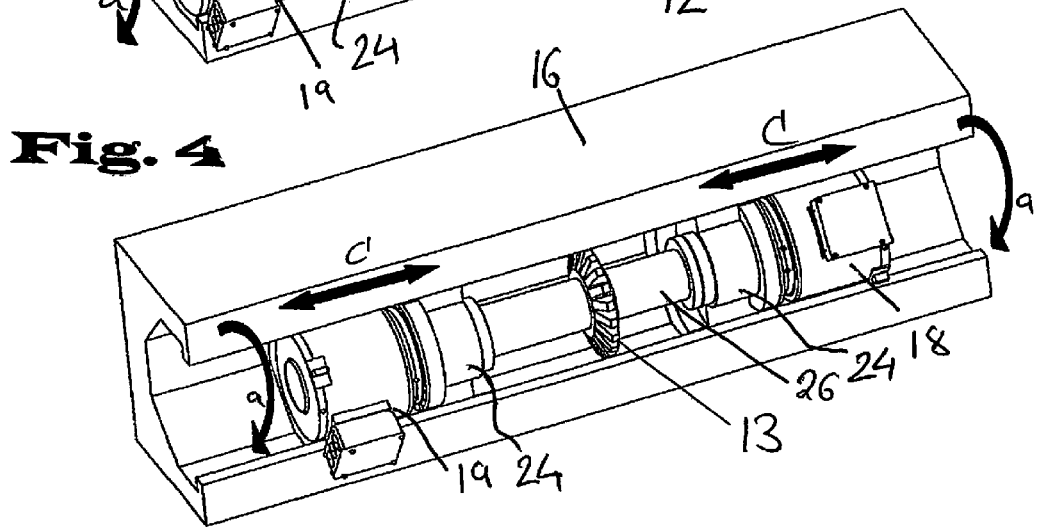
Figure 6:
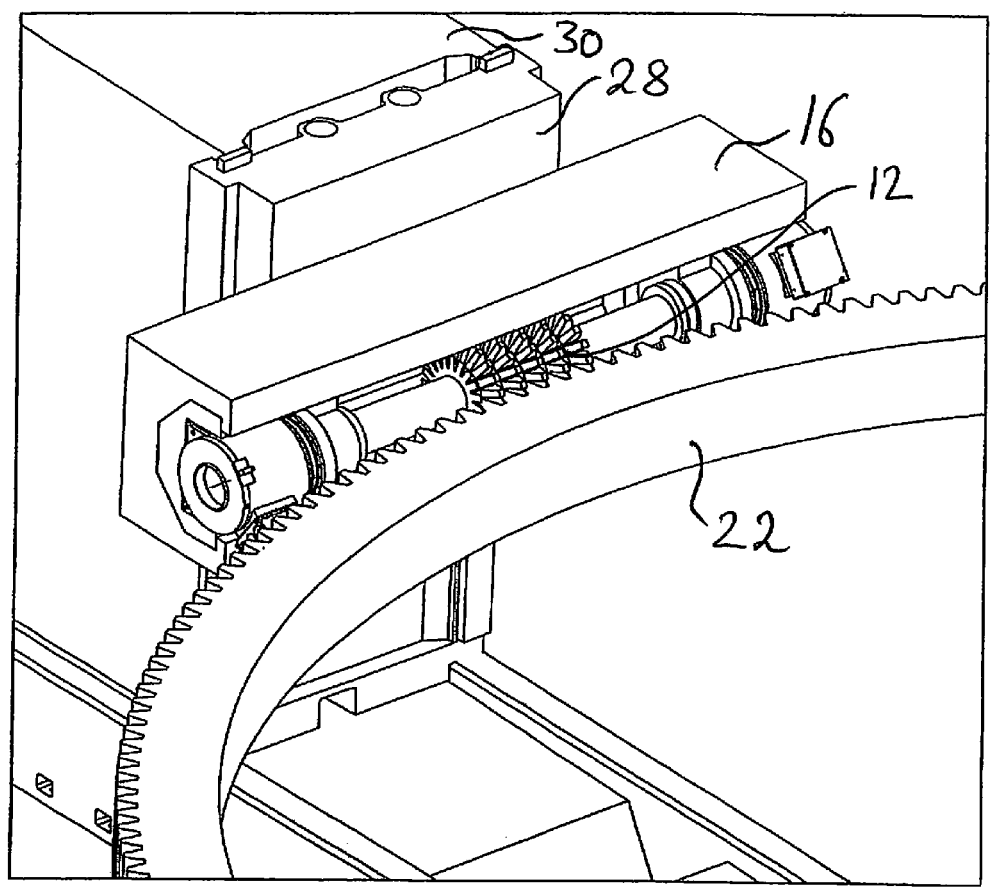
FIG. 6: shows a representation of the processing head of FIG. 5 in engagement with a correspondingly larger workpiece.

FIG. 2 shows a part of a processing machine 10 of FIG. 1 in the configuration of the processing head in accordance with the invention. Said processing head includes processing head bed 16 which in its construction and arrangement corresponds to that in accordance with the prior art. In this known processing head bed 16 in accordance with the present invention the drive is formed of two motors 18 and 19 which each are arranged on both sides of the tool not shown in detail in FIG. 2. Tool holders 24 are flange-mounted directly to the motors 18 and 19. The motors 18 and 19 can be shifted inside the processing head bed 16 in direction of the double arrows c and be fixed at a desired position by clamping, if necessary. Otherwise, the function of the shift axis is realized by shifting the two motors. As a result, different tools can be held by the tool holder 24 of the motors 18 and 19. In FIGS. 3 and 4, different tools are shown by way of example. In the embodiment of FIG. 3, a hobbing cutter 12 is arranged on a mandrel which is mounted between tool holders 24 of the motors 18 and 19. In this embodiment, the two motors 18 and 19 are moved apart very far and fixed in this position by clamping. This variant corresponds to the representation in FIG. 6, where the processing head bed 16 is arranged on a carriage 28 which is movable along the machine holder 30. The hobbing cutter 12 here is used for processing a workpiece 22 with large diameter. It is used for manufacturing a corresponding external toothing.

In FIG. 4, on the other hand, the distance between the motors 18 and 19 is comparatively smaller. Here, a mandrel with a side milling cutter 13 is held by the tool holders 24.

In FIGS. 2 to 4, the direction of rotation of the motors 18 and 19 and hence of the tool, for example of the hobbing cutter 12 in FIG. 3 or of the side milling cutter 13 in FIG. 4, is indicated by the direction of arrow a.

Figure 5:
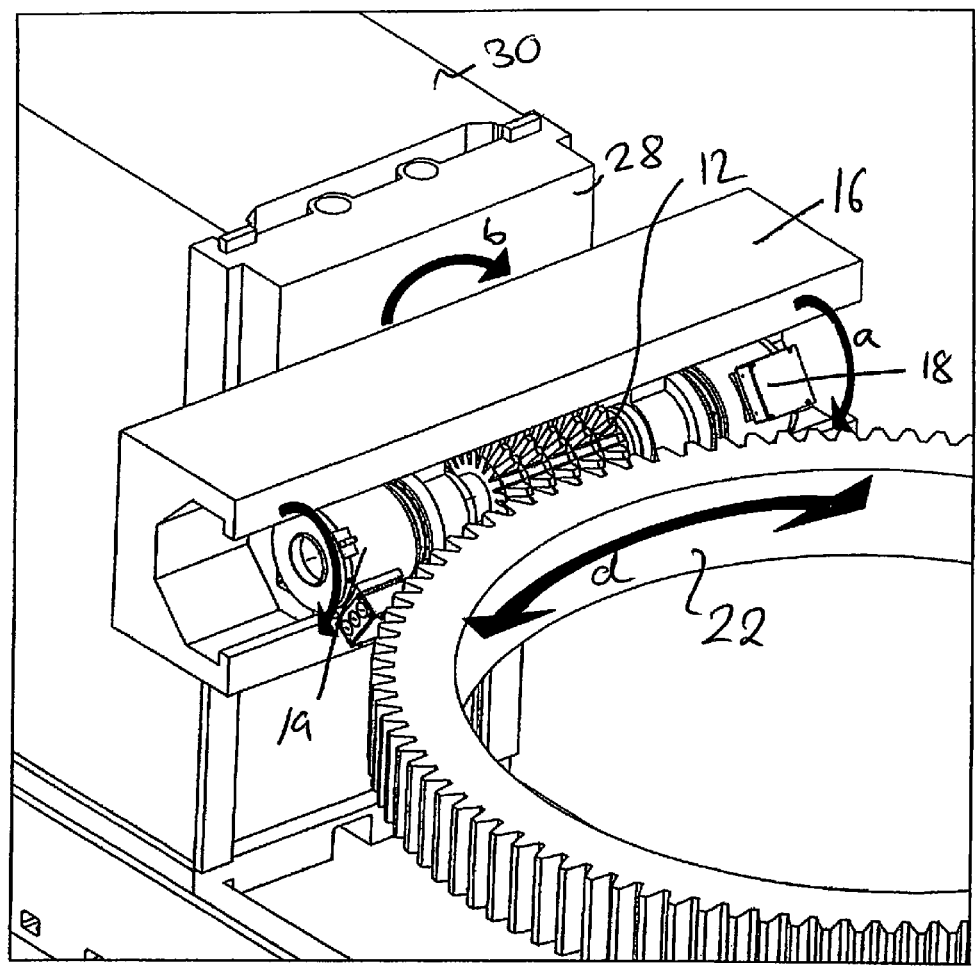
FIG. 5: shows a processing head in accordance with the invention in engagement with a workpiece.

In FIG. 5, a setting of the processing head of the present invention is shown, in which a workpiece 22 with smaller diameter is processed. For this purpose, a hobbing cutter 12 is clamped between the motors 18 and 19, wherein the clamping length of the mandrel 26 on which the hobbing cutter 12 is mounted is comparatively shorter than the one in FIG. 6, with which a workpiece 22 with greater diameter was processed. With the double arrow d the direction of rotation of the workpiece 22 is indicated. The swivel arrow b indicates the possibility of swiveling the processing head bed, whereby a helical toothing can be produced on the workpiece 22.

Figure 7:
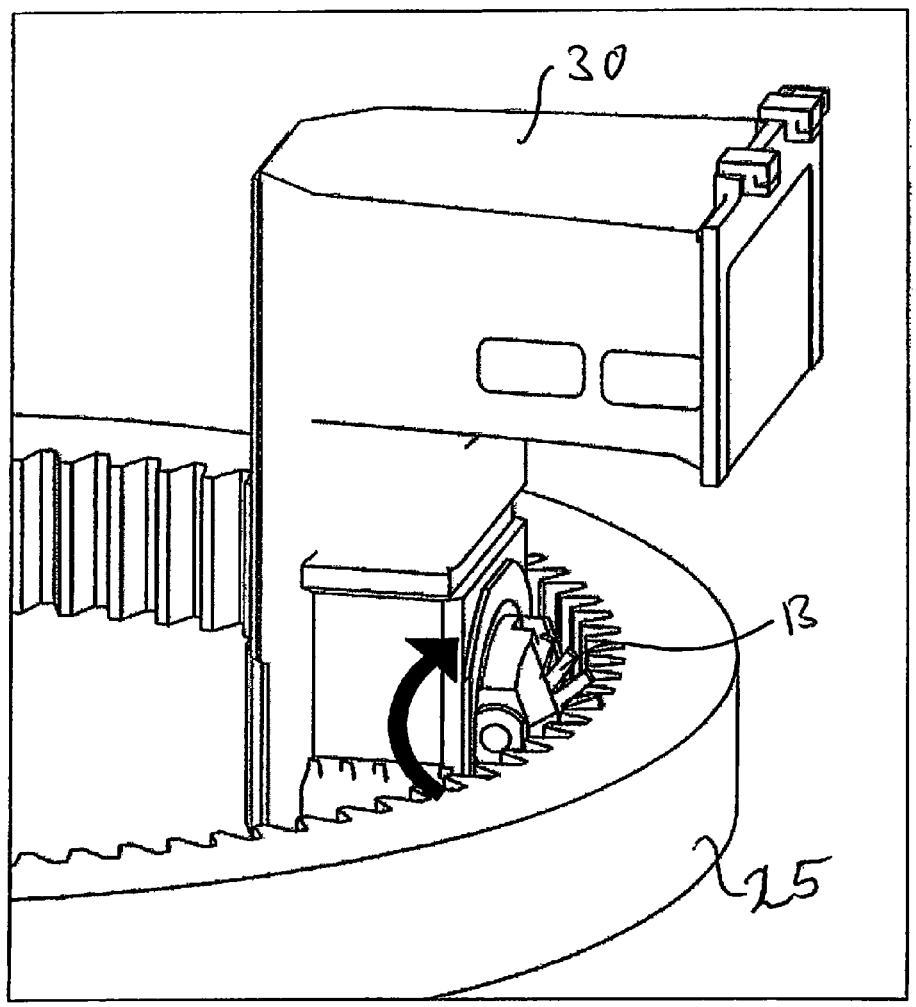
FIGS. 7 and 8: show an internal milling head in accordance with a further aspect of the present invention.
Figure 8:
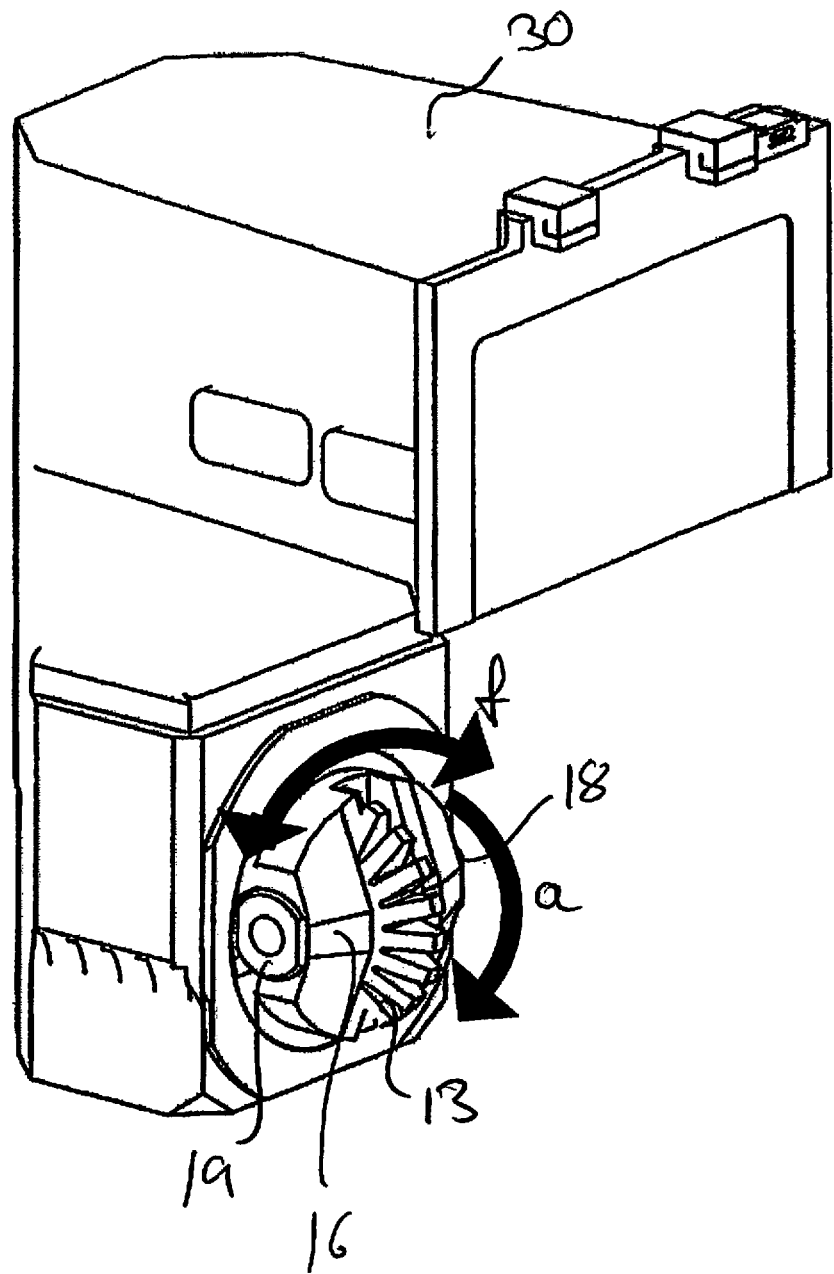
Figure 9:
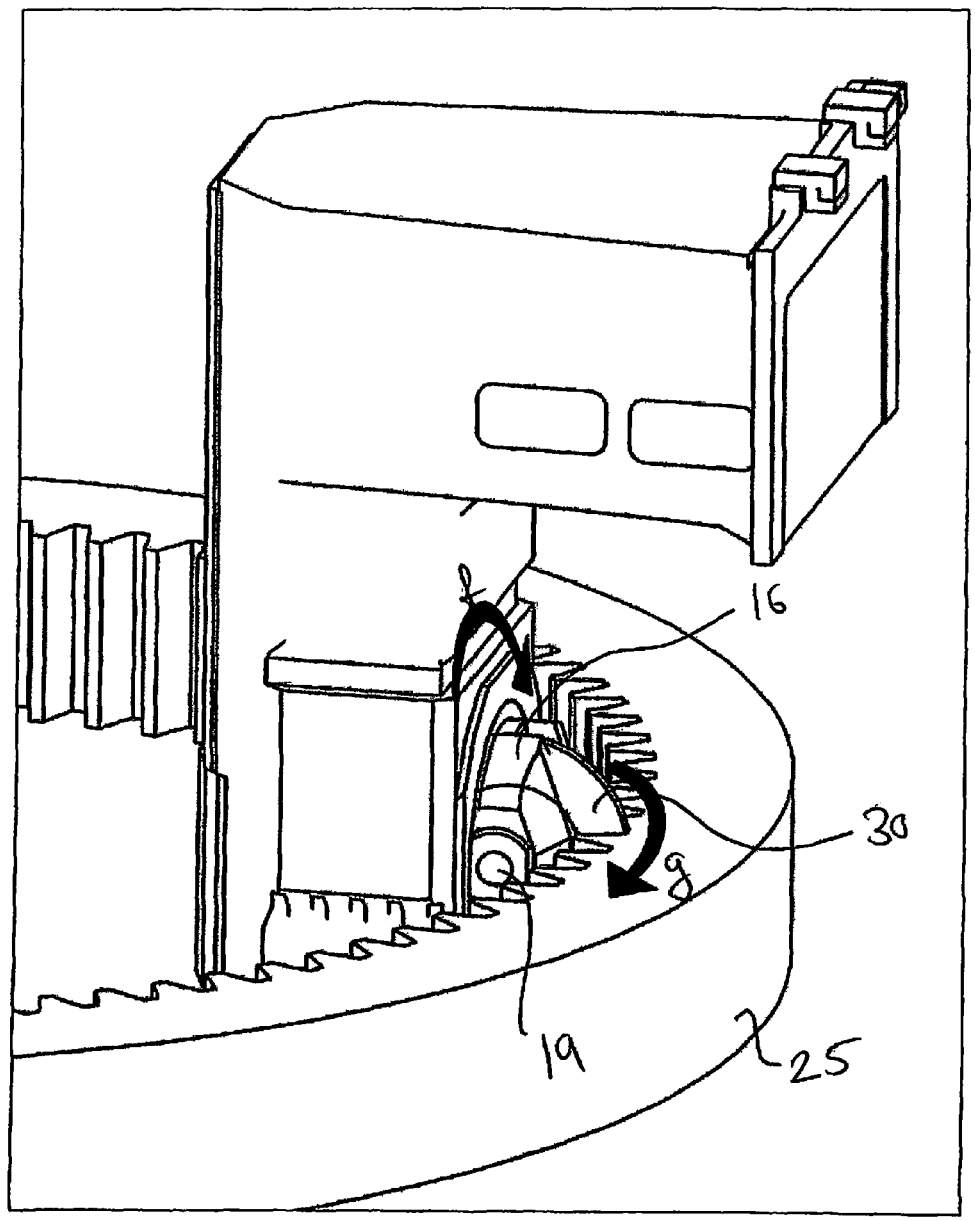
FIG. 9: shows an internal grinding head in accordance with an aspect of the present invention.

In FIGS. 7 to 9, another aspect of the processing head of the invention is explained. This is a processing head for processing the internal toothing of a workpiece 25, as shown in particular with reference to FIGS. 7 and 9. The arrangement of both motors inside a processing head bed 16 of very short design in this variant (cf. FIG. 8) provides for a very compact construction of the drive for the side milling cutter 18, which can be driven in direction of rotation of the arrow a in FIG. 8. Laterally in the processing head bed 16 the motors 18 and 19 formed as direct drives are shown, which advantageously can be operated in a master-slave operation. Due to the dual drive of both motors, a very high torque can be provided by comparatively small motors. This compact construction as a whole can be held in a correspondingly provided recess in the holding arm 30 and be pivotally mounted there, so that via a non-illustrated swivel motor a swivel movement in direction of the double arrow f can be effected. This provides for processing helical toothings, without having to swivel the entire holding arm 30. Rather, the axis of rotation for the internal milling cutter 13 for swiveling in direction of the double arrow f lies inside the processing head. As a result, the processing of helical toothings is substantially improved, since the disturbing contour can be avoided and comparatively smaller workpiece diameters can be processed especially with broad internal toothings.

The engagement of the side milling cutter 13 in the workpiece 25 to be processed is shown in FIG. 7. FIG. 9 shows an alternative variant, in which a grinding disk 30 is mounted as processing tool inside the processing head bed 16 and can be driven by the at least two motors 18 and 19. The entire processing head is gimbal-mounted and can be swiveled in the directions of arrow f and g by non-illustrated adjusting motors.

Even if the processing head of the invention is suitable in particular for use in large machines, the same can also profitably be used in comparatively smaller machines. Since the two motors are mounted in the processing head bed and fixed by clamping, the drive in the form of the two clamped motors can easily be pulled out of the processing head bed, if service is needed, and can be exchanged for a replacement insert.

The invention claimed is:

1. A processing head for processing machines, comprising
a direct drive,
a processing head bed of a processing machine in which the direct drive is arranged,
the direct drive comprising at least two motors (18, 19) actuatable in synchronism with each other, with both said motors (18, 19) arranged within the processing head bed (16), and
said at least two motors (18, 19) arranged to be controlled synchronously and together drive a single axle (a).

2. The processing head according to claim 1, wherein the motors are actuatable in synchronism or in a master-slave operation.

3. The processing head according to claim 1, wherein at least one of the motors can be shifted or fixed in the processing head bed.

4. The processing head according to claim 3, wherein both motors can be shifted in the processing head bed or be fixed by clamping.

5. The processing head according to claim 1, wherein it can be set against the workpiece from outside.

6. The processing head according to claim 1, wherein it constitutes an internal milling head/grinding head.

7. The processing head according to claim 6, wherein it is pivotally arranged in a holder together with the processing head bed and the motors.

8. A tooth milling and tooth grinding machine comprising the processing head according to claim 1.

9. The processing head according to claim 1, wherein said at least two motors (18, 19) are positioned on opposite ends of the single axle (a).

10. The processing head according to claim 9, wherein the single axle (a) is also positioned within the processing head bed (16).

11. The processing head according to claim 1, wherein the single axle (a) is also positioned within the processing head bed (16).

12. The processing head according to claim 1, additionally comprising tooth holders (24) flange-mounted directly to the motors (18, 19).

13. The processing head according to claim 10, additionally comprising tooth holders (24) flange-mounted directly to the motors (18, 19) and between the motors (18, 19) situated on the opposite ends of the single axle (a).

14. The processing head according to claim 13, additionally comprising a hobbing cutter (24) and a mandrel (26) on which the hobbing cutter (24) is mounted, with the mandrel (26), in turn, mounted as part of the single axle (a) between the tooth holders (24).

15. The processing head according to claim 13, additionally comprising a side milling cutter (13) and a mandrel (26) on which the side milling cutter (13) is mounted, with the mandrel (26), in turn, mounted as part of the single axle (a) between the tooth holders (24).

16. The processing head according to claim 1, wherein said at least two motors (18, 19) are mounted within the processing head bed (16) to be shiftable within and with respect to the processing head bed 6) in a direction (c) substantially parallel to the single axle (a).

17. The processing head according to claim 16, wherein the processing head bed (16) is additionally swivelly mounted (b) upon a carriage (28) in turn movably arranged on a machine holder (30) of a processing machine.

18. The tooth milling and tooth grinding machine according to claim 8, additionally comprising
a machine holder (30),
a carriage (28) movably mounted upon the machine holder (28), and
with the processing head bed (16) is swivelly mounted (b) upon the carriage (28).

19. The tooth milling and tooth grinding machine according to claim 18, wherein said at least two motors (18, 19) are mounted within the processing head bed (16) to be shiftable within and with respect to the processing head bed (16) in a direction (c) substantially parallel to the single axle (a).

20. The processing head according to claim 1, wherein the processing head bed (16) is additionally swivelly mounted (f) in a recess of a holding arm (30) of a processing machine.

21. The processing head according to claim 1, wherein the processing head bed (16) is additionally gimbally mounted in a recess of a holding arm (30) of a processing machine to swivel in two perpendicular directions (f, g).

* * * * *